Oct. 22, 1935.  J. BIJUR  2,017,847

LUBRICATION

Filed Jan. 22, 1930    4 Sheets-Sheet 1

INVENTOR
*Joseph Bijur*
BY
*Dean, Fairbank, Obrieght & Hirsch*
his ATTORNEYS

Oct. 22, 1935.　　　　J. BIJUR　　　　2,017,847
LUBRICATION
Filed Jan. 22, 1930　　　4 Sheets-Sheet 2

INVENTOR
Joseph Bijur
BY
his ATTORNEYS

Oct. 22, 1935.  J. BIJUR  2,017,847
LUBRICATION
Filed Jan. 22, 1930   4 Sheets-Sheet 3

INVENTOR
Joseph Bijur
BY
his ATTORNEYS

Oct. 22, 1935.    J. BIJUR    2,017,847
LUBRICATION
Filed Jan. 22, 1930    4 Sheets-Sheet 4

INVENTOR
Joseph Bijur
BY
ATTORNEYS

Patented Oct. 22, 1935

2,017,847

UNITED STATES PATENT OFFICE 2,017,847

LUBRICATION

Joseph Bijur, New York, N. Y., assignor to Auto Research Corporation, a corporation of Delaware Application January 22, 1930, Serial No. 422,534

28 Claims. (Cl. 184—7)

My present invention is concerned with central lubrication and has a particular field of usefulness in the oiling of all or some of the bearings of a motor vehicle.

It is among the objects of the invention to provide a simple self-contained strictly automatic system for feeding oil as long as the vehicle is running, to the various engine bearings or to the various chassis bearings as well as the engine bearings, all in accordance with the diverse requirements of the respective bearings.

It is another object to provide a system of the above type utilizing the contents of the engine oil pan as the common source of supply, and the engine oil pump as the common propulsive agency for delivering lubricant to both the engine bearings and the chassis bearings.

Another object is to provide a system of the above type devoid of moving parts or mechanism other than the engine oil pump and requiring no adjustment whatsoever, for supplying the oil requirements of the various engine and chassis bearings, more particularly one accomplishing nearly uniform rate of feed to the chassis bearings with oil of viscosity varying widely under different weather conditions, while at the same time properly feeding the engine oiling system which remains at more nearly uniform temperature summer and winter.

Among other objects are to separate out dirt from both the engine and the chassis oil, within a single chamber, while obviating impairment of settling due to convection currents within the chamber.

Another object is to provide a dirt-abstracting means from which sediment need be removed only at very infrequent intervals, which removal can be accomplished with ease, and without the need for replacement of a filter cartridge or other filtering medium.

A feature of the invention is the use of the ordinary engine oil pump to supply the chassis lubricating system, and of appropriate intercepting means to clean not only the oil passed into the chassis system but in addition to clean the oil ordinarily returned to the oil pan through a separate engine oil filter.

A common dirt settling chamber with outlet at its top serves as the cleaning element both for the chassis oil and for the engine oil. Preferably the flow resistance imposed by the system feeding the chassis and that imposed by the cleansing course of the engine oil are so high that the upward oil stream through the settling chamber during normal operation is slower than the rate of sediment settling, wherefore abstraction of dirt within the settling chamber during operation of the system is substantially assured.

The slow feed through the settling chamber is consistent with the needs of the chassis lubricating system, which should feed oil at extremely slow rate to meet the current requirements of the chassis bearings. For this purpose a drip plug system of the general type described and claimed in my prior Patents Nos. 1,632,771 of June 14, 1927, and 1,732,212 of October 15, 1929, is particularly suitable. While the drip plugs may be made with such fine flow restrictions, as themselves to retard the flow to the required degree under continuous feed at full pump pressure, it is preferred to utilize drip plugs within the range of proportions specified in my prior patents, and to afford the required additional retardation by means of a fixed master flow restriction through which the chassis system is supplied, and which when disposed at the water jacket or other part of temperature nearly constant summer and winter obviates the great falling off in rate of feed to the chassis bearings otherwise occurring due to increase in viscosity during cold weather, of the oil in the chassis lines.

Both cleaned engine oil and chassis oil may have passed through one master resistance which suitably retarded the flow through the settling chamber, or separate master resistances may be provided for the chassis and the cleaned engine oil flow. Since reasonably satisfactory results are obtained even though the oil returned to the engine oil pan be not completely cleaned, it is permissible to dispense with the dense filter in the engine oil return, provided the corresponding separate master resistance is not so highly restricted as to become clogged by entrained solids, the resistance being in that case attained by considerable extra length of small but open bore conduit.

In the accompanying drawings in which are shown one or more of various possible embodiments of the several features of the invention.

Figure 1:
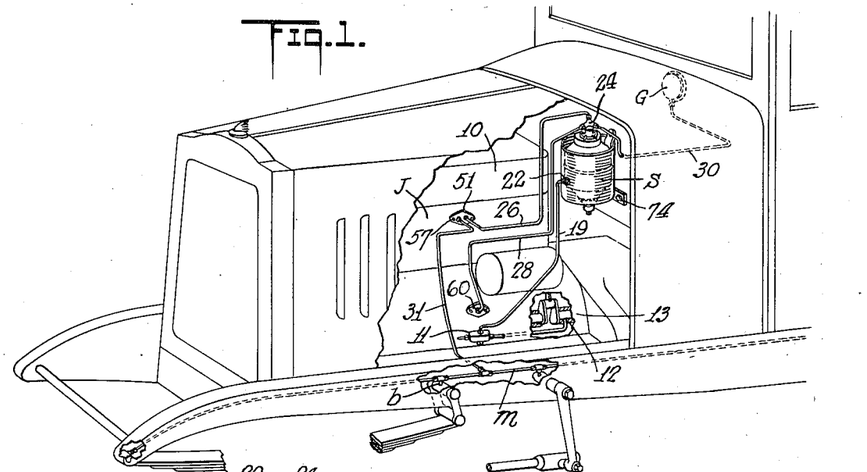
Fig. 1 is a diagrammatic perspective view showing a desirable embodiment of the installation.
Figure 2:
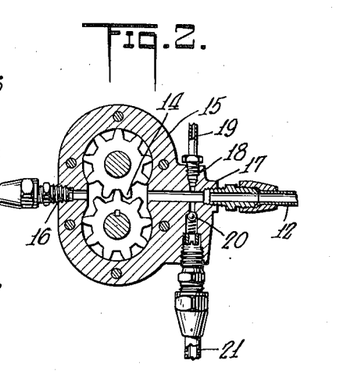
Fig. 2 is a sectional view through a desirable form of engine oil pump.

Referring now to the drawings there is shown in Fig. 1 a perspective view of an automobile having an engine 10 equipped with an engine oil pump 11 which feeds through the usual pipe 12 to the engine bearings 13. The oil pump as shown in Fig. 2 is illustratively the conventional gear pump 14, the casing 15 of which has an inlet 16 from the engine oil pan, an outlet 17 to the engine bearings, another outlet 18 feeding a pipe 19 through which passes oil to be cleaned, and in part returning to the crank case and in part fed to the chassis lubricator as will be hereinafter more fully set forth. In addition the casing may have a spring seated relief valve 20 delivering back to the crank case through pipe 21 and determining the maximum pressure exerted by the pump.

The outlet pipe 19 leads to a settling chamber S shown in detail in Fig. 3, and to be hereinafter described. It may be noted here, the inlet to the settling chamber is shown at 22, below the top, and the outlet 23 is through the top, so that propulsion of oil through the settling chamber is upward rather than downward.

Exit of oil from the top of the settling chamber is illustratively through a dividing head 24, having a branch 25 which feeds the chassis lubricating system through pipe 26 and a branch 27 which feeds through pipe 28 back to the oil pan. The head 24 has a third branch 29 through which pressure is applied by way of pipe 30 to pressure gauge G at the instrument board.

The chassis lubricating system per se is the subject matter of copending applications but for the sake of completeness it will be briefly described here. The system includes mains $m$ extending the length of the chassis frames, having branches $b$ leading to various bearings.

Each of the branches is preferably equipped with a flow resistance or obstruction, calibrated to the diverse proportional requirements of the several bearings. The entire or a substantial part of the length of each branch may be conformed or plugged to constitute the flow resistance or obstruction fitting, but in a preferred embodiment, such fitting comprises a drip plug at the outlet end of each branch. The drip plug may be of any of various possible constructions, examples of which are disclosed in my prior Patent No. 1,632,772 of July 14, 1927 and in the prior British patent to Auto Research Corporation No. 261,697 of March 13, 1926.

Figure 4:
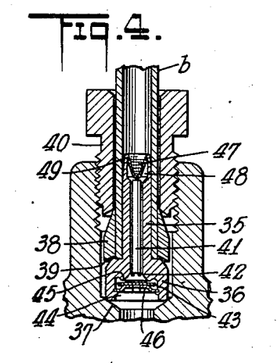
Fig. 4 is a view in longitudinal cross-section through a preferred form of drip plug outlet.

A specific construction particularly useful in the present relation is shown in Fig. 4 and is quite similar to the disclosure of the prior British patent referred to. The construction need be described but briefly, as it is claimed herein only in combination as a constituent part of the system as a whole.

The drip plug comprises a cartridge unit 35 having an enlarged head 36 abutting at its edge against the bevelled bottom 37 of the bearing socket. The shank of the cartridge is of reduced diameter and is encircled by the end of the feed pipe $b$ which abuts against the head of the cartridge and is clamped against said shank by a compression coupling. This compression coupling includes a tapered coupling sleeve 38 having a milled convex end 39 pressed against the head of the cartridge by the inner end of a bushing 40 which encircles the pipe. The bushing 40 is threaded into the socket and forces the edge of the coupling sleeve 38 inward against the pipe $b$ to clamp the latter against the cartridge shank 35.

The cartridge has a longitudinal bore of accurately predetermined diameter, housing a pin 41 also of accurately predetermined diameter which determines a crevice of definite resistance to flow under a given pressure. The resistance or rating of the cartridge will depend on the diameter of the pin and the rating will preferably be marked upon the cartridge. The pin is maintained in place within its bore by staking the cartridge as at 42 at the lower extremity of the pin.

Preferably a flap disk valve 43 is disposed in an axial socket 44 within the head of the cartridge and coacts with an annular seat 45 formed in said head and is limited in its displacement from said seat by a closure cap 46 sprung in place within the head.

A protective strainer 47 is disposed in a corresponding enlargement 48 at the inlet end of the cartridge. This strainer may comprise a conically shaped area of wire mesh having its reduced end toward the head of the pin and its rim trapped under an inturned head 49 at the extremity of the cartridge.

To cut down the flow to the extremely slow rate required for continuous feed from the engine oil pump, which exerts a high pressure in the order of twenty-five pounds per square inch, and yet to use drip plugs of the relatively low order of flow resistance set forth in my prior patents above identified, additional resistance R is placed in series with the chassis line, of flow retarding effect so high compared with that of the drip plugs that it cuts down the total rate of flow substantially to requirements. This master flow resistance R is maintained at temperature more nearly uniform summer and winter than is the chassis system exposed to the weather. Illustratively the master resistance is disposed at the water jacket J of the engine, although it may be disposed at the intake manifold or other region where the temperature is more nearly uniform throughout the seasons.

Figure 5:
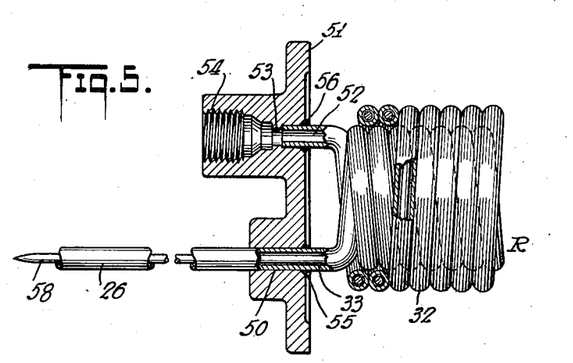
Fig. 5 is a view partly in section of a preferred form of master resistance for the chassis system.

There is illustratively disclosed a simple form of master control resistance in Fig. 5, which comprises a tube 32 of copper or other equivalent material of bore in the order of $\frac{1}{8}$ inch diameter and containing a wire restriction 33 therein of diameter in the order of .056 inches. The tube and wire which are illustratively four feet or more in length, are preferably coiled into a compact unit, here shown, with fourteen turns, approximately 1½" in diameter, wound in two superposed layers of seven turns each. This arrangement is merely illustrative of various possible expedients for disposing an elongated resistance in a compact volume, where such arrangement is desired.

In the arrangement shown, the resistance coil R is a unitary piece with pipe 26. The inlet end of coil R extends through a hub 50 on a mounting plate 51 carrying the coil. The outlet 52 of coil R extends into bore 53 of mounting plate 51, and delivers to outlet socket 54 integral with said plate. The opposite ends of the resistance coil R may be affixed by brazing as at 55 and 56 to plate 51. The mounting plate 51 is affixed illustratively against the cooling water jacket J by means of bolts 57, with the coil R protruding into the hot engine cooling water through an opening (not shown) in the wall of the jacket.

Solid particles of colloidal nature remaining in the oil even after cleansing in chamber S, are apt to be left behind at the entrance end of restriction wire 33 probably due to the inertia effect resulting from the sudden increase in linear speed of the oil, when the cross section of the oil passage is suddenly reduced, where the wire begins.

To avoid the consequent clogging, the inlet end and preferably also the outlet end of the restriction wire 33 is tapered or pointed as at 58 so that the decrease in effective cross section of the oil passage, and the consequent increase in speed of oil flow occurs gradually rather than suddenly and such inertia effect is eliminated.

Moreover the pointed end 58 of the wire 33 is preferably disposed as shown, at least some inches away from the water jacket, at a place having a relatively lower temperature, where the viscosity of the oil is higher and the tendency for particles to separate out and clog is correspondingly less. No marked change in linear flow rate occurs while the oil passes through the restricted coil, and no clogging or separation therein is incurred.

The coil R having a resistance to flow dominating or controlling as compared with that of the chassis distributing system, and being at roughly constant temperature summer and winter, the rate of feed to the chassis bearings will vary but slightly during the ranges of summer and winter use, where otherwise the change in flow rate between said ranges would be tremendous.

Figure 6:
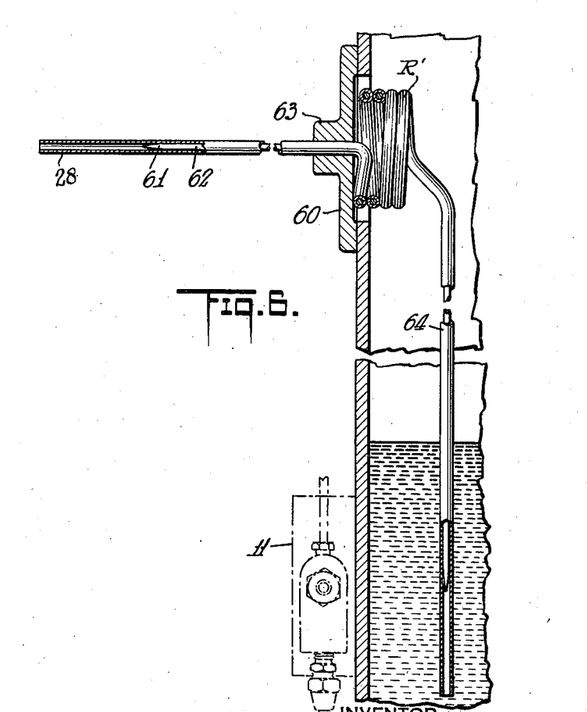
Fig. 6 is a view partly in section showing part of the engine oil cleansing line.

The return pipe 28 to the oil pan is preferably of small bore, say $\frac{1}{16}''$ or less and thus offers a substantial resistance to flow. Preferably, however, a resistance unit in the form of a coil R′, similar to that shown in Fig. 5 is provided within the warm crank case, to which it is preferably affixed by a mounting plate 60 the pointed inlet end 61 of the restriction wire 62 protruding through hub 63 of the plate 60 to the exterior of the warm crank case. The coil R′ has a drooping outlet or tail 64, extending downward into the engine oil pan, preferably to a level substantially below the lowest operating level of the oil in the oil pan.

Figure 3:
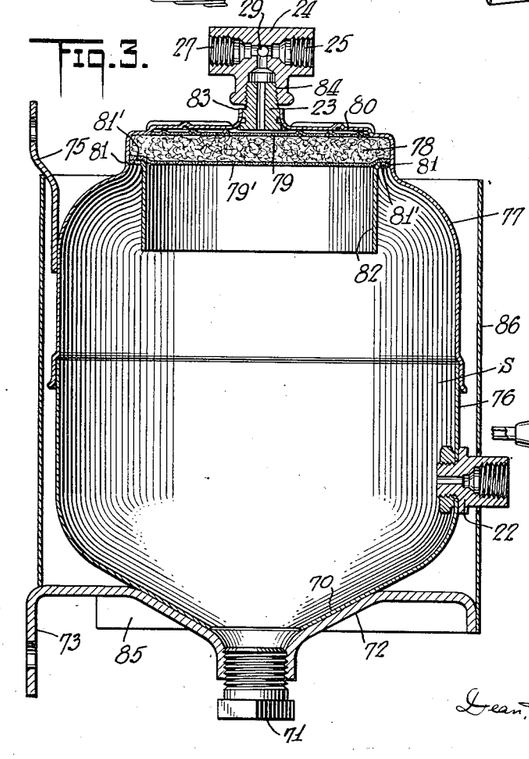
Fig. 3 is a view in longitudinal cross-section of a preferred form of the settling chamber indicated in Fig. 1.

The common settling unit S for cleaning the engine oil and the oil of the chassis system is shown in detail in Fig. 3. This unit preferably comprises a strong metal vessel or can which may specifically be of capacity of a quart or thereabouts. Illustratively the can has a conical bottom 70 resting in a correspondingly formed supporting bracket 72 and soldered into leak-proof relation therewith and affixed at wings 73 by means of bolts 74 to the front of the dashboard. An auxiliary bracket 75 fastens the upper end of the can to the dashboard. A drain plug 71 is screwed into the bracket 72.

The can is preferably made of two halves, a lower half 76 over the upper rim of which is telescoped the rim of the upper half 77. The upper half 77 has preferably a filter disk 78 of densely compacted felt at the top thereof. The filter has a corrugated wire mesh backing plate 79 at the upper surface thereof, which is pressed against the corrugated top 80 of the can, by means of the flange 81 of a shield collar 82 which exerts pressure against a supporting mesh screen 79′ under the filter disk and clamps the rim thereof in place. The flange 81 is in turn staked in place. Through a central aperture 83 in the top of the tank extends a mounting nipple 23 upon which the dividing head 24 is screwed at 84.

Preferably there is telescoped over the downturned edge 85 of the supporting bracket 72 the extended skirt of a cylindrical metal shield 86 extending substantially the height of the settling chamber and affording an air jacket thereabout for a purpose pointed out hereinafter.

When the new vehicle is set into operation, the engine oil pump promptly charges settling chamber S with clean engine oil. Throughout operation of the vehicle, continuous lubrication of the chassis, and continuous cleaning takes place of the engine-oil that is pumped into the settling chamber. The engine oil pump 11 feeds to the engine bearings in the usual manner. Simultaneously therewith, the said pump forces lubricant through pipe 19 and inlet 22 into the settling chamber S, which is maintained filled with lubricant from the pump.

The outlet from the settling chamber being highly restricted due to the coil R′ in the engine-oil return line 28 and to the master resistance coil R with the associated restricted chassis system in parallel with said engine oil return, the linear rate of oil flow into the settling chamber under the propulsive pressure of the pump is extremely slow. The great bulk of the oil pump output flows through the engine bearings or through the pressure relief valve 20. The settling chamber S being of relatively large diameter as shown, the flow stream therethrough from the inlet 22 upward through the outlet 23 advances at extremely slow rate, slower than the rate at which solid particles of dirt in the engine oil would gravitate or settle downward within the warm oil in the heated chamber S under the engine hood. The settling chamber being completely filled with oil, no agitation or sloshing thereof will occur, even under vibration of the running vehicle and substantial disturbance or turbulence of the sediment is avoided. Convection currents within chamber 5 are also to be avoided, because this would impair cleaning by settling, and carry some of the sediment upward and clog the filter 78. The insulating effect of the air jacket formed by the encircling protective shield 86 will assure uniform heating of the chamber by the hot gases arising in the engine compartment under the hood and will prevent heating of one side of the settling chamber relative to the other by radiation from the contiguous hot engine, and thereby minimize convection. The depending shield or apron 82 within the top of the settling chamber moreover will divert any residual convection current about skirt 82, and will maintain in quiescent condition the oil immediately encircled thereby and contiguous to outlet nipple 23. The likelihood of unclean oil being delivered out of the settling chamber is thus but small.

The filter 78 affords an additional precaution for protecting the system therebeyond should any disturbance occur in the settling. From another point of view the filter cleans the oil, but is protected from clogging by the action of the settling chamber therebelow, which renders feasible the use of a relatively small filter.

The filter is preferably not so dense as to intercept particles of a colloidal nature as above mentioned which are so small as to pass on through the master resistance and the drip plugs to the bearings.

The clean oil passes from the settling chamber through nipple 25 to the chassis lubricating system and particularly by way of pipe 26 through highly restricted control coil R and thence to the distributing chassis system by way of pipe 31, mains m, branches b and drip plugs to the corresponding bearings. As above pointed out, the calibrated drip plugs assure correct division of the oil among the various chassis bearings in accordance with their respective requirements, and the master coil R in series with the chassis system approximately determines the correct total rate of feed to the chassis system. Being at temperature roughly constant summer and winter the master coil maintains a total rate of feed nearly uniform under all weather conditions, notwithstanding the tremendous rise in viscosity of oil in the chassis system with cold weather.

Concurrently with the chassis lubrication described, cleaned oil is propelled from the settling chamber, through the nipple 27 through the conduit 28 and the resistance unit or coil R' back to the engine oil pan. Were the return flow to the oil pan not highly restricted as shown, the flow of oil therethrough and accordingly through the settling chamber S might be at rate so high as to interfere with the proper separating out of sediment. By retarding the rate of flow through the return path for cleaned engine oil, which is fed in parallel with the highly resistant chassis lubricating system, the upward stream through the settling chamber is kept at rate so slow that settling effectively occurs. The oil pump which supplies the settling chamber and the return pipe from the settling chamber to the oil pan being both below the level of oil in the engine oil pan, no siphoning or drainage from the filled settling chamber will occur while the vehicle is idle.

At intervals of from six months to one year or more, it is desirable to remove the collected sediment from the settling chamber. This can be conveniently done by removing the drain plug 71 and dropping out the accumulated sludge. In case of neglect to empty out the settling chamber even at the very infrequent intervals recommended such as yearly, and if as a consequence the dirt should cover the filter with a thick layer, then the settling chamber could very readily be dismounted and the vessel be washed with gasoline or carbon tetrachloride, and thereafter a blast of air may be passed through nipple 23 to separate any solid particles that may have adhered to the filter felt 78. The wire mesh support 79' protects the felt 78 from objectionable bulging under such air cleaning action. It will thus be seen that the occasional cleaning of the settling chamber is all that is required to restore it to operativeness. There is no need for purchasing replacement filler, filter or cartridge units.

The gauge G measures the pressure exerted by the engine oil pump upon the master control resistance and acts incidentally to apprise the user if the filter disk has become clogged, for at such time building up of the gauge pressure would be impeded to such extent as to afford a visual alarm.

While the preferred system described, affords continuous cleaning of oil throughout running of the vehicle, it is understood that useful results of somewhat lower standard might be accomplished, even though the oil be fed at higher rate through the settling chamber than contemplated in the above description, settling occurring during the usual period of overnight idleness of the vehicle.

In the system as described, the settling chamber performs in a superior manner the function of the usual engine oil cleaner. Large effective volume is afforded for settled sediment as distinguished from the case with fabric filled filter cans. Moreover the cost of refill cartridges and the bother of obtaining them are saved. In addition to the engine oil cleaning action, this unit also performs the function of cleaning the oil for the chassis system as above set forth, but the invention in its broader aspects is useful for engine oil cleaning wholly apart from chassis lubrication.

Were air allowed to become trapped in the settling chamber then upon starting the engine, oil would enter rapidly until the entrapped air had been substantially compressed and during such short period of rapid flow the sediment might become stirred up sufficiently to impair operation. The outlet from the settling chamber being through the top, air is naturally eliminated in normal action. Separate ports 81' in the flange 81 of the skirt 82 immediately below the filter assure the venting of any air that might otherwise become trapped in the annular cavity within the chamber about skirt 82.

Figure 7:
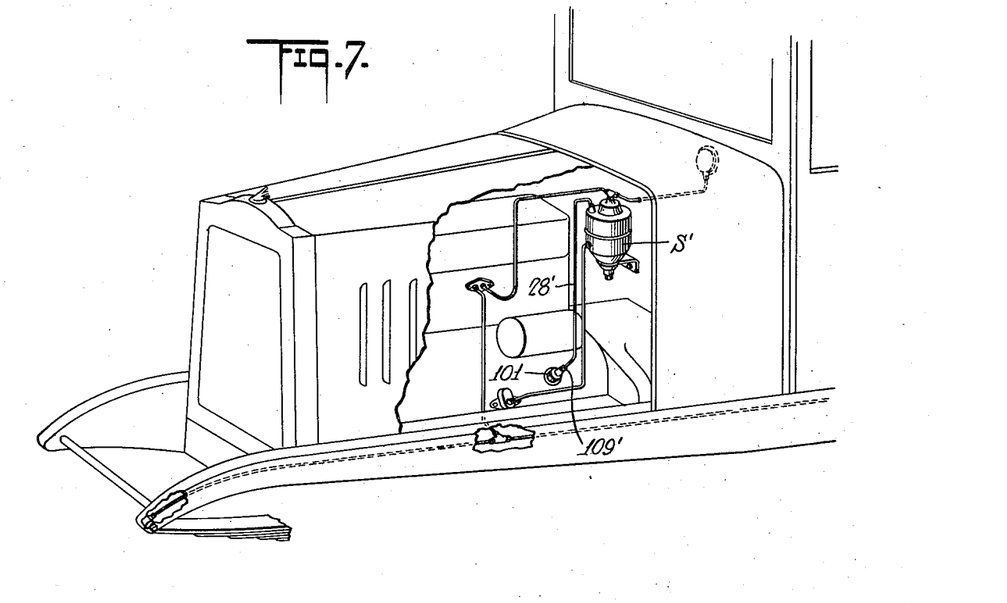
Fig. 7 is a diagrammatic perspective view similar to Fig. 1 of a modified system.
Figure 8:
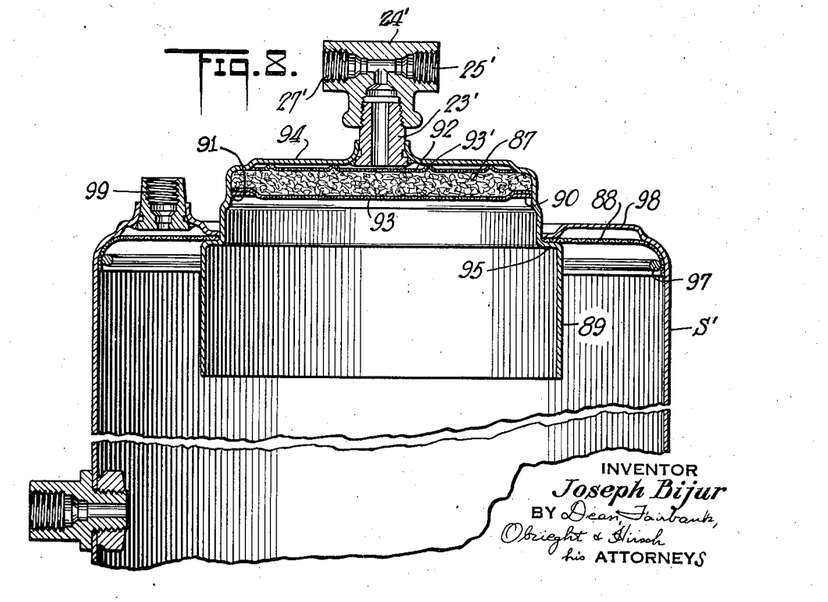
Fig. 8 is a fragmentary view in longitudinal cross-section of the top of a modified form of cleansing unit useful in the system of Fig. 7.

In the modified form of installation shown in Fig. 7, corresponding elements bear the primed reference numerals of Fig. 1. In this embodiment the settling chamber S' affords the filter safeguard only for the oil to the chassis system while the settled or cleaned oil fed from chamber S' back to the engine oil pan is not so filtered but preferably merely screened. The return pipe 28' from the settling chamber to the oil pan is shown provided with flow resistance comprising sufficient extra length of pipe unrestricted by a filler wire so that even fairly large particles might be passed back to the oil pan without clogging the return passage. In Fig. 8 is shown a preferred construction of settling chamber particularly useful in this embodiment and in Fig. 9 a special construction of engine oil return resistance. The chassis resistor and distributing line thereof are preferably identical with those of Figs. 1 to 4.

In the embodiment of Fig. 8 the settling chamber S' is shown with a protective filter 87 in its top, for the chassis lubricating system and a screen 88 for the return flow to the oil pan. In the illustrative embodiment shown the chassis oil is fed through a hood piece 89 to which the felt filter disk 87 is affixed by means of a clamping ring 90 staked in place at 91 and reacting against a wire mesh supporting screen 93. The upper face of felt disk 87 is covered by a wire mesh backing screen 92 with corrugations 93' contacting the head 94 of the hood. The hood carries a nipple 23' similar to that of Fig. 3 which in turn mounts a T head 24' with two branches 25' and 27' respectively to the chassis line and the gauge as in Fig. 1.

The chassis outlet hood is preferably provided with a shoulder 95 which clamps in place the inner periphery of the annular screen 88 encircling the hood 89 and clamped in place at its outer periphery by clamp ring 97. The top of the can is embossed upward at 98 and thus spaced from the main area of annular screen 88. The outlet socket 99 in the top of the settling chamber feeds the oil therefrom to the engine return through a pipe 28'.

By the arrangement described the settled oil for the chassis is filtered, as in the embodiment heretofore described and the skirt 89 of the hood serves as a diverter to hinder disturbance due to convection currents. The settled oil returned to the engine oil pan however is only passed through the fine mesh screen 88 of less effectiveness than the felt filter, and more likely to pass some solid particles therethrough.

Figure 9:
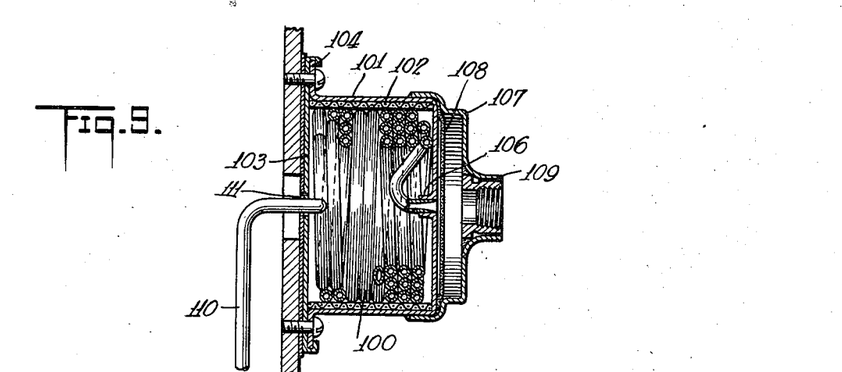
Fig. 9 is a view in longitudinal section of a resistance unit for the engine oil cleansing line.

The extra length of pipe for affording added flow resistance to retard exit of settled oil through the nipple 99 back to the engine oil pan is preferably embodied in a compact unit shown in Fig. 9 and including illustratively about fifteen feet of pipe, illustratively of bore of $\frac{1}{16}$ inch diameter shown wound in a helical coil 100 of three layers of eight turns each and enclosed in a can 101 preferably provided with a liner 102 and closed by a disk 103 crimped over protruding rim 104. The inner extremity of coil 100 is flared into an inturned hub 106 centrally of the end of the can. A cap 107 is preferably telescoped over said end of the can and affixed thereto by soldering or brazing, and its rim clamps a wire mesh screen 108 in place agains the can. The cap is spaced with respect to the can end, and has a socket piece 109 welded therein to which the outlet end of feed pipe 28' from the settling chamber is affixed by a coupling or the like. The outlet of resistance unit 100 is illustratively at disk 103, through which the end of the coil 100 protrudes to form tail pipe 110.

The rim 104 of the can serves as a mounting flange by means of which the unit is affixed to the engine crank case preferably at the exterior thereof, and the tail pipe 110 extends through a central opening 111 in disk 103 and droops downward therefrom preferably in the manner of Fig. 6 to well below the lowest level of oil in the oil pan.

Figure 10:
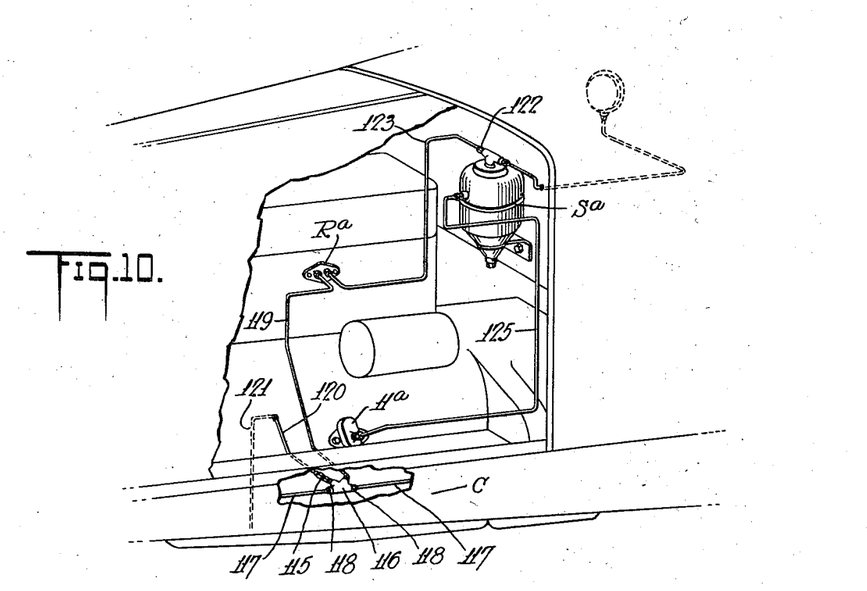
Fig. 10 is a diagrammatic view similar to Figs. 1 and 7 of another modification.

In Fig. 10 is shown a modification in which a single master resistance unit R$^a$ of appropriate specifications and preferably similar in construction to that shown in Fig. 5, supplies both the chassis distributing system and in parallel therewith the return to the engine oil pan. The chassis distributing system may be identical in every respect with that of Fig. 1, and may have at the outlets thereof drip plugs identical with those of Fig. 4. As in the other embodiments the engine oil pump 11$^a$ feeds a settling chamber S$^a$ through a feed pipe 125.

The return to the engine is controlled preferably by a drip plug construction 115 similar to that of Fig. 4, but preferably devoid of a valve. Drip plug 115 is in a junction piece 116 from which the chassis line 117 is supplied through outlets 118 and to which the feed pipe 119 delivers from the master resistance R$^a$, which is shown mounted at the hot water jacket. The drip plug 115 feeds through pipe 120 to tail pipe 121, the outlet of which is submerged under the lowest level of oil in the engine oil pan. The drip plug 115 is preferably disposed as shown at the exposed part of the channel frame C where its temperature is approximately the mean temperature of the chassis bearings, and is preferably of relatively high rating to deliver at rate in the order of the total rate of flow to the chassis lubricating system.

The settling chamber S$^a$ is preferably identical with that of Fig. 3 or 7 except that it has but a single outlet 122 feeding pipe 123 to the master resistance R$^a$ and preferably delivering oil cleaned through a filter similar to that shown in Fig. 3.

The operation will be obvious from the description of other embodiments, it being noted that the settled and filtered output propelled from the settling chamber S$^a$ by the action of the oil pump 11$^a$ is divided in reasonably uniform proportion under various temperature conditions between the chassis bearings and the engine return.

The specific construction of resistance unit shown in Figs. 5, 6 and 9 and the drip plug shown in Fig. 4, each taken by itself, is not claimed herein, as these elements are the subject matter of companion applications.

While the sleeve 86 about the settling chamber of Fig. 1 for reducing convection currents is not shown, in the embodiments of Figs. 7 and 10 it may be there employed if desired.

The subject matter disclosed but not claimed herein is covered in the copending applications Serial No. 412,982, filed Dec. 10, 1929, Serial No. 490,574 (Patent No. 1,953,959), Serial No. 486,380 (now Patent No. 1,974,416). It is to be understood that the lubricating installations of the present application may be used in other connections and in other combinations than specifically shown and the system as specifically described may be employed for supplying lubricant to other apparatus than automobile chassis.

As many changes could be made in the above construction, and many apparently widely different embodiments of this invention could be devised without departing from the scope thereof, it is intended that all matter contained in the above description or shown in the accompanying drawings shall be interpreted as illustrative and not in a limiting sense.

I claim:

1. In a motor vehicle, means for lubricating the engine bearings and the chassis bearings continuously during operation of the vehicle from a common oil pump in an engine oil pan, said means including an oil cleaning return from the oil pump to the oil pan and a chassis lubricating system of the drip plug type supplied with lubricant from said oil cleaner, said oil cleaner comprising a settling chamber delivering substantially through its top to the oil cleaning return and to the chassis system.

2. A lubricating system for the engine and the chassis bearings of a motor vehicle comprising an engine oiling system and a chassis oiling system, both deriving their oil from a common oil pan and both being supplied under the pressure of the engine oil pump, said systems connected in parallel, an oil cleaning unit in the course of flow to the chassis system, and a conduit returning to the oil pan part of the oil treated by said cleaning unit.

3. A lubricating system for the engine and the chassis bearings of a motor vehicle comprising an engine oil pan, a pump deriving lubricant therefrom, engine and chassis oiling systems fed under pressure from said pump in parallel with each other, an engine oil cleaning unit in the course of flow to the chassis system, said cleaning unit including a settling chamber and a conduit returning to the oil pan part of the oil treated by said cleaning unit.

4. In a motor vehicle, the combination of an oil pump feeding to the engine bearings, a settling chamber supplied from said pump, a centralized chassis system and an engine oil return pipe both supplied from said settling chamber in parallel with each other and with said engine bearings, said chassis system and said engine oil return imposing high resistance to flow, thereby effecting relatively slow feed of oil through the settling chamber.

5. In a vehicle of the type including an engine having a central system for lubricating the bearings thereof, a chassis having a central system of the drip plug type for lubricating the bearings thereof, an engine oil pump for delivering oil to all of said bearings, and an oil pan containing the lubricant therefor; the combination therewith of a common means for cleaning the oil for the chassis system and for the engine bearings, said means comprising a settling chamber having an inlet from the engine oil pump and delivering to the engine oil pan and to the chassis system, and means in the course of flow beyond the outlet of the settling chamber to retard the flow of oil to rate sufficient to permit effective settling out in the settling chamber of dirt carried with the oil.

6. A lubricating system for the engine and the chassis bearings of an automobile comprising an oil pan and an engine oiling system and a chassis oiling system supplied therefrom, said systems connected in parallel, an oil settling chamber in the course of flow to the chassis system, and a conduit returning to the oil pan some of the oil treated by said settling chamber, said chassis lubricating system being of type to afford a flow resistance sufficient to retard the oil flow therethrough to the extremely slow rate required for continuous chassis lubrication, and said return conduit in parallel therewith being of flow resistance such that the linear rate of oil propulsion through the settling chamber is less than the rate of normal settling of dirt therein.

7. In a motor vehicle of the type comprising an engine having a pressure lubricating system, a chassis having a centralized lubricating system of the drip plug type, an engine oil pump connected to circulate oil through the engine bearings, an oil cleaning chamber supplied from said engine oil pump in parallel with the engine bearings, and having an outlet substantially at its top leading to the chassis lubricating system, and a return conduit of substantial flow resistance, leading to the engine oil pan and supplied from near the top of said settling chamber.

8. A combined engine and chassis lubricating system comprising an engine oil pan, an engine oil pump supplied therefrom, dirt abstracting means, a flow resistant outlet from said abstracting means for conveying lubricant therefrom back to the oil pan, a second flow resistant outlet from said abstracting means leading to the chassis lubricating system, said latter system having flow proportioning restricted outlets.

9. In a motor vehicle, a lubricating system comprising an engine oil pan, an engine oil pump deriving lubricant therefrom and feeding under pressure to the engine bearings, a chassis lubricating system supplied by said pump in parallel with said engine bearings, said chassis system of the drip plug type, an oil cleaning unit in the course of flow from the pump to the chassis system, said cleaning unit embodying a settling chamber having a filter protected outlet, said settling chamber having also a screen protected outlet through its top and a return conduit from said latter outlet feeding back to the engine oil pan and having flow resistance of the order of that of said chassis lubricating system.

10. In a lubricating system for a motor vehicle, the combination of a source of lubricant, an oil pump, a centralized distributing system supplied from said source and pump, a protective settling chamber interposed in the course of flow from said pump to said system and at level higher than said source and said pump, and a return flow conduit from said settling chamber to said source having its outlet end dipping under the level of lubricant at said source.

11. In a motor vehicle, a lubricating system of the type in which the engine oil pump feeds lubricant from the engine oil pan both to the engine bearings and to the chassis bearings; the combination therewith of an oil cleaning unit including a settling chamber mounted at level higher than the engine oil pump, said unit delivering its cleaned output in parallel to the chassis bearings and to the engine oil pan, the chassis system being of the high flow resistance type, the engine return having flow resistance of the order of that of the chassis distributing system, and the outlet end of the engine return conduit extending under the oil level in the engine oil pan.

12. In a motor vehicle of the type comprising an engine having a pressure lubricating system, a chassis having a centralized lubricating system of the drip plug type, an engine oil pump connected to circulate oil through the engine bearings, an oil cleaning chamber supplied from said engine oil pump in parallel with the engine bearings, and having an outlet substantially at its top leading to the chassis lubricating system, a crank case return conduit supplied from near the top of said settling chamber, said chassis lubricating system imposing a resistance to flow greater than said crank case return for correspondingly slower feed, and means shielding the settled oil near the chassis outlet of the settling chamber from disturbance due to the more rapid flow to the crank case return.

13. In a motor vehicle, means for lubricating the engine bearings and the chassis bearings continuously from a common oil pump in an engine oil pan, said means including an oil cleaner, a return conduit system from the oil pump to the oil pan passing through said cleaner, and a chassis lubricating system of the drip plug type supplied with lubricant from said oil cleaner, said oil cleaner comprising a settling chamber delivering substantially through its top to said return and to the chassis system, and a protective shield within the upper part of the settling chamber about the body of lubricant flowing to the chassis system.

14. A system for lubricating the engine and the chassis bearings of a motor vehicle, including an engine oil pump, an oil cleaning unit, a chassis lubricating distributing system, and a return conduit system to the engine oil pan both supplied in parallel from said oil cleaning unit, said return conduit system having flow resistance therein maintained at temperature approximately the mean temperature of the chassis bearings.

15. An installation for lubricating the engine and the chassis bearings of a motor vehicle including an engine oil pan, an engine oil pump deriving lubricant therefrom, an oil cleaning unit in communication therewith, a chassis lubricating distributing system connected to said cleaning unit, and having highly restricted outlets, a return conduit from the cleaning unit to the engine oil pan, said conduit having a flow restriction at a part thereof exposed to the weather and of resistance in the order of that of said chassis lubricating system.

16. An installation for lubricating the engine and the chassis bearings of a motor vehicle including an engine oil pan, an engine oil pump deriving lubricant therefrom, an oil cleaning unit including a settling chamber connected with said oil pump, a chassis lubricating distributing system supplied from the upper part of said unit and having drip plug outlets, and a return pipe leading from the upper part of said cleaning unit to the engine oil pan and having a drip plug resistance at a part thereof exposed to the weather and of flow resistance in the order of that of the chassis lubricating system.

17. A system for lubricating the engine and chassis bearings of a motor vehicle including an engine oil pump, an oil cleaning unit comprising a settling chamber supplied from said pump and having a filter-protected outlet at its top, a master flow resistance delivering the output from said unit and maintained at temperature more nearly constant than that of the external atmosphere, a central chassis distributing system supplied from said master flow resistance and having drip plug outlets, and an engine oil return pipe connected in parallel with said distributing system and having a drip plug resistance in the length thereof exposed to the external atmosphere and of flow resistance of the order of that of said chassis system.

18. An engine lubricating system of the return flow cleaner type including a settling chamber in the course of return flow having an inlet from the engine oil pump, an outlet at its top and a return conduit to the engine oil pan connected to said outlet, and having flow resistance greatly to retard the upward stream of lubricant through said settling chamber.

19. An engine lubricating system of the return flow cleaner type including a settling chamber in the course of return flow having an inlet from the engine oil pump comprising a substantial length of pipe having relatively fine bore to impose substantial flow resistance, the temperature of the greater portion of the length of said pipe being exposed to the external air for greater flow retarding effect in cold weather, thereby to retard the stream through the settling chamber to compensate for the slower rate of settling more viscous oil.

20. An installation of the character described including an engine oil pump, a settling chamber supplied therefrom, flow resistant outlet means in the course of flow from the upper part of said settling chamber, said means including a chassis lubricating system and a restricted return conduit to the engine oil pan, said settling chamber being constructed and arranged to vent through the outlet any air therein.

21. An engine oil cleaning installation for an automotive engine provided with a lubricant reservoir, a pump immersed therein, means to drive said pump from said engine and a distributing conduit system leading from said pump to bearings of said engine, said installation including a by-pass conduit from said pump to said reservoir and a sedimentation chamber for removing substantially all of the dirt in the oil upon said by-pass conduit in such proximity to the engine as to be heated thereby, said chamber at the outlet thereof being also provided with means to assure a sedimentation flow substantially free of eddies and with means to prevent uneven heating of the lubricant body undergoing sedimentation.

22. In a motor vehicle, means for automatically lubricating the engine bearings and the chassis bearings continuously during operation of the vehicle by means of a common oil pump in an engine oil pan, said means including a restricted oil cleaning return from the oil pump to the oil pan including an oil cleaner and a restricted conduit between the oil cleaner and the pan, and a chassis lubricating system supplied automatically with cleaned engine oil from said oil cleaner, said chassis system consisting of a branched piping installation with a single restricted inlet from said oil cleaner and a plurality of flow proportioning outlets to said chassis bearings.

23. In an automotive vehicle lubricating system of the type utilizating the engine oil pump for supplying the engine bearings, the combination therewith of a chassis lubricating system including an oil settling chamber interposed in the course of flow from the engine oil pump to the chassis system, said settling chamber being provided with a flow obstructing means at its outlet retarding the feed therethrough to such extent as to permit settling out of solid particles from the oil.

24. In an automotive vehicle lubricating system of the type supplying engine bearings, and chassis bearings under pressure from a continuously operating pump; the combination therewith of a dirt abstracting unit including a sedimentation chamber in the path of flow from the pump to the chassis system, said unit being provided with means for removal from time to time of sediment therefrom.

25. In an automotive vehicle lubricating system of the type, supplying the engine bearings and the chassis bearings, from a continuously operating pump; the combination therewith of a settling chamber interposed in the course of flow from the oil pump to the chassis lubricating system; means for retarding the flow of oil from the engine oil pump through the settling chamber to such extent as to permit settling of dirt to occur in said chamber during operation, and means whereby sediment may be removed from the settling chamber.

26. An engine oil cleaning installation for an automotive engine provided with a lubricant reservoir, a pump immersed therein, means to drive said pump from said engine and a distributing conduit system leading from said pump to bearings of said engine, said installation including a by-pass conduit from said pump to said reservoir and a sedimentation chamber for removing substantially all of the dirt in the oil upon said by-pass conduit in such proximity to the engine as to be heated thereby, a restriction being provided in the course of flow from the chamber to decrease the flow through said chamber to the sedimentation rate, said chamber being provided with a depending skirt for assuring smooth upward flow in said chamber and for reducing the tendency toward the formation of eddy currents said automotive engine being also provided with a chassis lubricating system, with an inlet from said sedimentation chamber and a plurality of outlets to said bearings with a plurality of restricted outlets to the chassis bearings, said restricted outlets having a lesser degree of restriction than said restriction provided in the course of flow from the chamber.

27. A drip plug lubrication installation for distributing lubricant to a plurality of bearings comprising a source of lubricant and a conduit arrangement provided with flow passages with enlarged and restricted flow areas, said enlarged flow area passage being provided with a depending baffle, and with a bottom inlet and a top outlet to assure vertically upward flow, whereby sedimentation and resultant cleansing will ensue, said conduit arrangement being also provided with filters ahead of said restricted flow areas and after said enlarged flow area passage in the line of flow, said restricted flow areas being all positioned after said enlarged flow area in the line of flow.

28. A drip plug lubrication installation for distributing lubricant to a plurality of bearings comprising a source of lubricant and a conduit arrangement provided with flow passages with enlarged and restricted flow areas, said enlarged flow area passage being provided with a depending baffle, and with a bottom inlet and a top outlet to assure vertically upward flow, whereby sedimentation and resultant cleansing will ensue, said conduit arrangement being provided with a filter ahead of said restricted flow areas and after the enlarged flow area passage in the line of flow and said restricted flow area being formed of an elongated tube substantially filled by an elongated pin with a tapered inlet end, to cause gradual change of the velocity in lubricant flow upon entry into the restricted flow areas, said restricted flow areas being all positioned after said enlarged flow area in the line of flow.

JOSEPH BIJUR.